No. 78,140. PATENTED MAY 19, 1868.
T. SHIPTON.
FEED WATER HEATER.
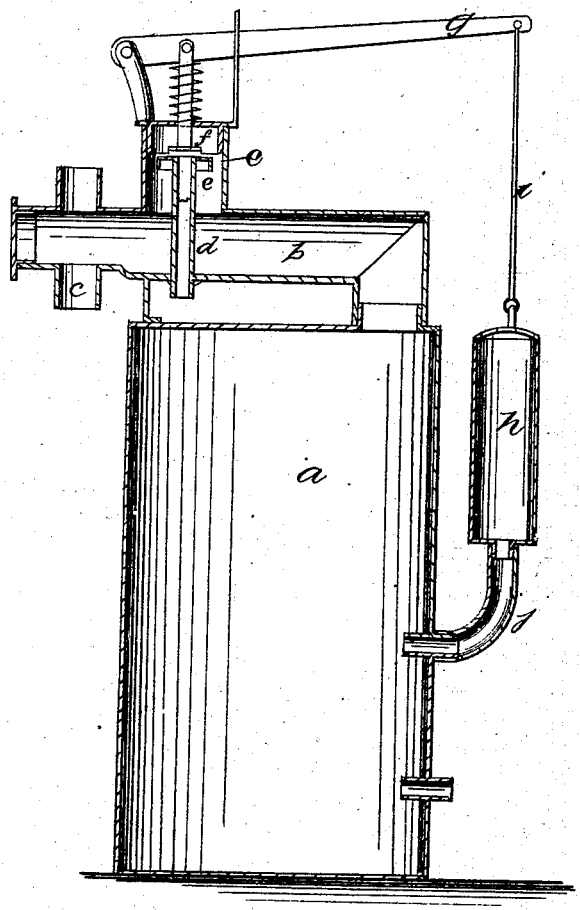

United States Patent Office.

THOMAS SHIPTON, OF NEWARK, NEW JERSEY.

Letters Patent No. 78,140, dated May 19, 1868.

IMPROVEMENT IN FEED-WATER HEATERS.

*The Schedule referred to in these Letters Patent and making part of the same.*

TO ALL WHOM IT MAY CONCERN:

Be it known that I, THOMAS SHIPTON, of Newark, in the county of Essex, and State of New Jersey, have invented a new and improved Heater; and I do hereby declare that the following is a full, clear, and exact description thereof, which will enable others skilled in the art to make and use the same, reference being had to the accompanying drawing, forming a part of this specification.

The present invention relates to a new and improved heater, by which cold water may be heated up to the boiling-point by means of steam from the exhaust-pipe of a steam-engine or pump, and let run into a tank or reservoir, which is so arranged by a water-balance, that, as soon as the water in the tank rises up to a given point, the said water-balance will cause the feed-valve to close, and will open again of its own accord as the water falls, thus keeping a constant supply of hot water in the tank or reservoir, the construction and operation of which will be understood from the following description, reference being had to the accompanying drawing, which represents a sectional elevation of my improved heater.

The letter $a$, in the accompanying drawing, represents a tank or reservoir, with an elbow-pipe, $b$, leading from its top, and connecting with the exhaust-pipe $c$ of a steam-engine or pump.

$d$ is a cold-water feed-pipe, which is run up into the elbow-pipe $b$. The top of the cold-water pipe has a large flat surface or seat, $e$, with a flat valve resting on the same. The valve-stem $f$ is pivoted to the lever $g$. The object in having a large flat surface on top of the cold-water pipe is for the purpose of spreading the water as it oozes up through the pipe, thus allowing the water to fall gently in a thin sheet, which will become heated rapidly from the exhaust steam, and falling on the heated pipe $b$, which conducts it to the reservoir or tank below.

The bottom of the pipe $b$ is made flat, so as to spread, and give more heating-surface to the water, as it flows along the same on its passage to the reservoir.

The ball or cylinder $h$, which forms the water-balance, is suspended from the lever $g$ by the rod $i$, and is connected with the tank or reservoir $a$ by means of the flexible tube $j$, which will allow it to hang on the lever, and at the same time to be connected with the tank or reservoir, so that as the water rises over a given height, it will cause the ball or cylinder $h$ to weigh down the lever $g$, and thus close the feed-valve, which will open again of its own accord as soon as the water falls sufficiently to lighten the weight of the ball or cylinder $h$.

Having thus described my invention, what I claim as new, and desire to secure by Letters Patent, is—

1. The cylinder $h$, suspended from the lever $g$ of the valve $f$, and connected with the reservoir $a$ by the flexible pipe $j$, substantially as and for the purpose herein set forth.

2. In combination with the reservoir $a$, the elbow $b$, having a flat lower surface, the exhaust-pipe $c$, and water-supply pipe $d$, provided with a broad flange, $e$, around its top, forming a seat for the valve $b$, all constructed and arranged to operate as and for the purpose herein specified.

The above specification of my invention signed by me, this thirty-first day of March, 1868.

THOMAS SHIPTON.

Witnesses:
J. ALISON FRASER,
ALEX. F. ROBERTS.